United States Patent [19]

Clark

[11] Patent Number: 4,704,013

[45] Date of Patent: Nov. 3, 1987

[54] AUXILIARY ADJUSTING MECHANISM FOR OPTICAL INSTRUMENTS

[75] Inventor: James A. Clark, Honeoye Falls, N.Y.

[73] Assignee: Bausch & Lomb Incorporated, Rochester, N.Y.

[21] Appl. No.: 650,927

[22] Filed: Sep. 14, 1984

[51] Int. Cl.[4] .................. G02B 21/26; F16H 35/18
[52] U.S. Cl. ........................ 350/530; 474/37; 74/10.7
[58] Field of Search ............ 350/521, 522, 528–530; 74/479, 480 R, 10.7; 474/37

[56] References Cited

U.S. PATENT DOCUMENTS

| 3,194,080 | 7/1965 | Olson | 74/10.7 |
| 4,083,256 | 4/1978 | Shio | 350/530 |
| 4,223,771 | 9/1980 | Peterson | 474/37 |

FOREIGN PATENT DOCUMENTS

| 666978 | 7/1963 | Canada | 474/37 |
| 2002469 | 2/1979 | United Kingdom | 474/37 |

Primary Examiner—John K. Corbin
Assistant Examiner—Loha Ben
Attorney, Agent, or Firm—John S. Norton

[57] ABSTRACT

A precision optical instrument includes an auxiliary focusing mechanism coupled to the primary focusing mechanism such that rotation of the auxiliary mechanism rotates the primary mechanism.

9 Claims, 6 Drawing Figures

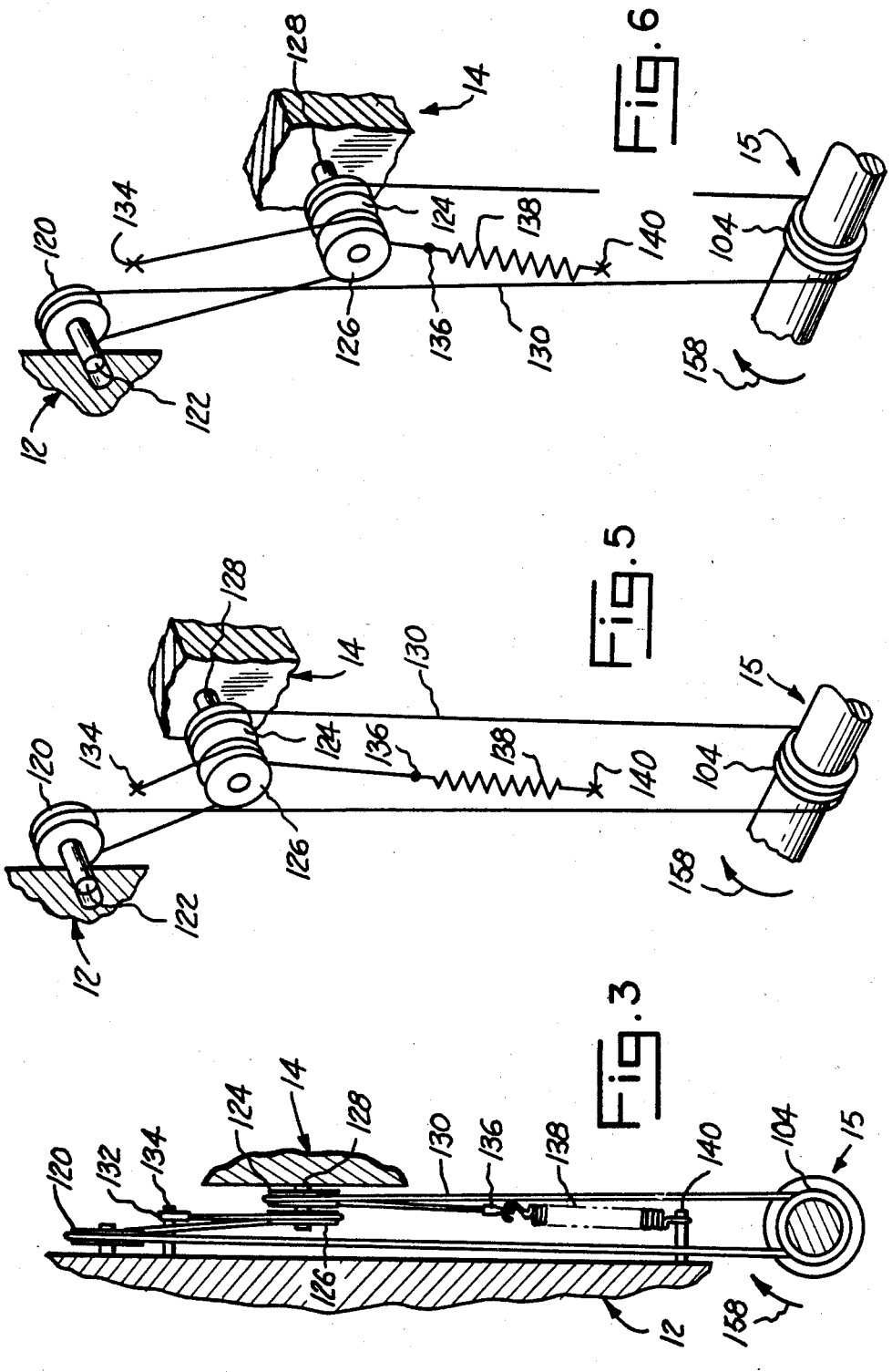

AUXILIARY ADJUSTING MECHANISM FOR OPTICAL INSTRUMENTS

CROSS-REFERENCE TO RELATED APPLICATIONS

The present application is related to U.S. Ser. No. 650,756 entitled "Cable Drive Focusing Mechanism for Optical Instruments", filed Sept. 14, 1984 for inventors James A. Clark and Michael Dobner and U.S. Ser. No. 650,928 entitled "Apparatus for Adjusting Play in a Precision Optical Instrument", filed Sept. 14, 1984 for Michael Dobner.

BACKGROUND OF THE INVENTION

1. Field of the Invention

This invention relates to an auxiliary adjusting mechanism for optical instruments, such as microscopes, and particularly to an adjusting mechanism which cooperates with the normal coarse/fine adjusting shaft and may be used as an alternative thereto for providing relative movement of one member with respect to another, such as a stage relative to the viewing optics.

2. Description of the Prior Art

In the past, precision optical instruments, such as miroscopes, have commonly used coarse and fine adjusting shafts for providing movement of one member relative to another. The coarse and fine adjusting shafts may be separate from each other, or as is more common in precision instruments, the shafts may be mounted coaxially to each other. In either event, the adjusting shafts are coupled to an adjustable member, such as a stage or head assembly, by any convenient manner so that rotation of the shaft(s) produces a corresponding and proportional amount of movement in the movable manner.

Depending on the type of instrument being utilized, many of the coarse/fine adjusting mechanisms used in the past were awkward to reach for some operators and therefore difficult to manipulate. An additional shortcoming is that in many instances neither the coarse nor the fine adjustments provide the appropriate adjustments.

There have been numerous attempts to address the problem of providing an alternative to the adjustments provided by the normal coarse and fine mechanisms. U.S. Pat. No. 4,083,256 issued Apr. 11, 1978 to M. Shio is typical and discloses a single axis coarse and fine adjusting device which has been provided with an intermediate adjusting mechanism. While this device does provide an alternative adjustment between coarse and fine, it is complicated in construction requiring a high degree of precision in manufacture and assembly. Further, the intermediate adjustment provided for in the Shio patent is limited by the interaction of the coarse and fine assemblies. A further disadvantage of this mechanism is that it is mounted coaxially with the coarse and fine mechanism which, for some operators may be awkward to manipulate.

In U.S. Ser. No. 385,734 filed June 7, 1982 James A. Clark (now U.S. Pat. No. 4,482,221), the inventor of the instant device, disclosed a device which would provide an adjustment in addition to the normal coarse and fine adjustments. Although the device was mounted coaxially with the coarse and fine shafts, it included a mechanism which could easily be manipulated by the operator. However, this mechanism, while solving some problems, is restricted to the amount of adjustment that can be accomplished in that the mechanism allows for only very limited movement.

Therefore, it will be seen that the above described adjusting mechanisms suffer from a variety of problems, such as cost, complexity of construction which requires a highly skilled technician to assemble and poor replacement of parts.

As will be detailed hereinafter, the adjusting mechanism of the present invention presents a solution to the problems set forth above by providing an auxiliary mechanism which is easily manipulated to give an alternative choice to the normal coarse and fine adjustments. The adjusting mechanism is economical to manufacture, easy to assemble and accurate within very tight tolerances.

SUMMARY OF THE INVENTION

An auxiliary adjusting mechanism is adapted to couple with and drive a coarse and fine adjusting mechanism which is provided in precision optical instruments such as microscopes. The auxiliary mechanism is mounted to the optical instrument so as to provide an alternative to the operator to the coarse and fine mechanism.

BRIEF DESCRIPTION OF THE DRAWINGS

FIG. 3 is a partial section taken along line 3—3 of FIG. 1;

FIGS. 5 and 6 are schematic diagrams of the closed loop adjusting mechanism.

DETAILED DESCRIPTION OF THE PREFERRED EMBODIMENT

Figure 1:
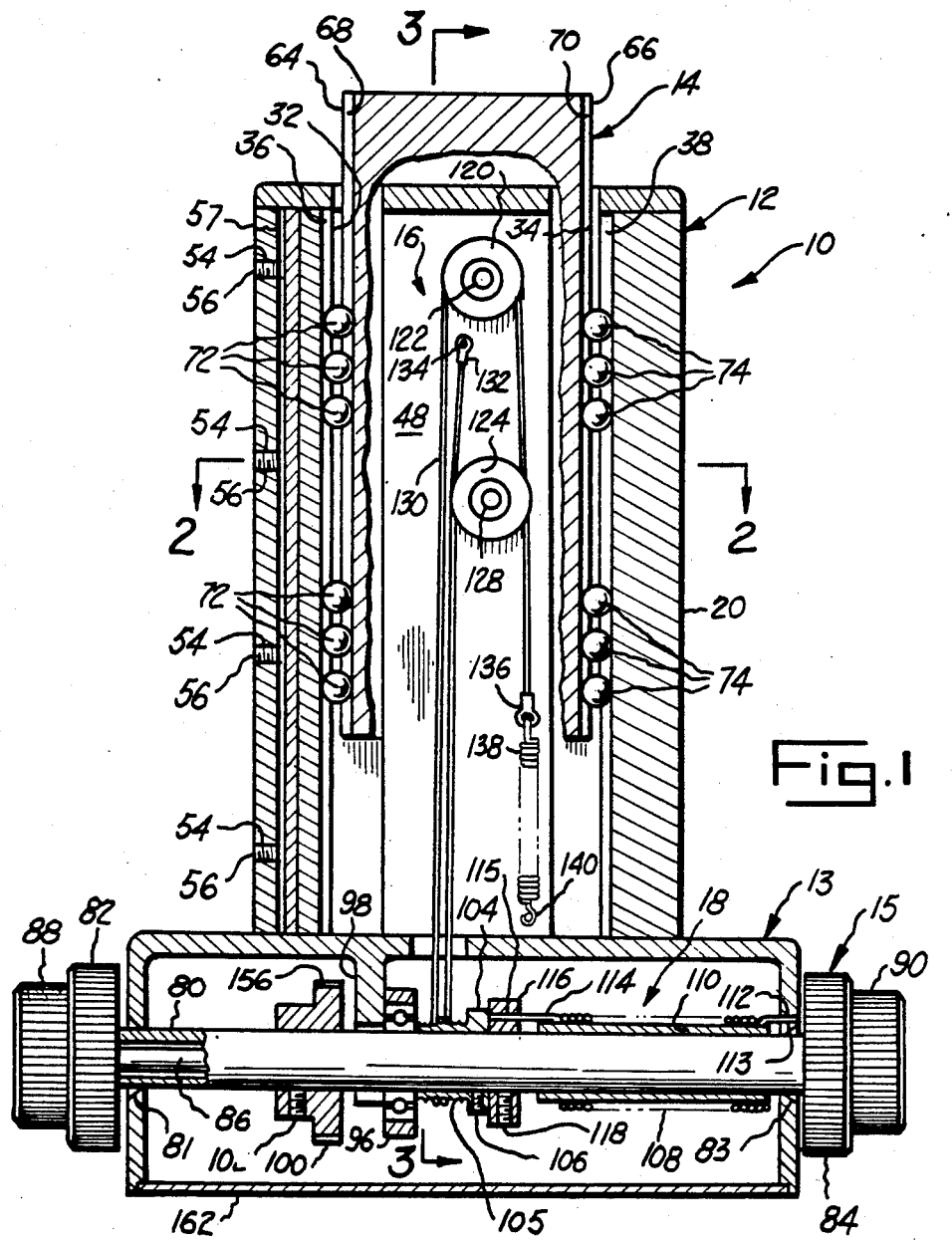
FIG. 1 is a partially sectioned front view of an optical instrument incorporating the adjusting mechanism of the present invention.

An optical instrument 10, such as a microscope, is shown in FIG. 1 and comprises a support column 12, a slide member 14 mounted to the column for low friction movement, a closed loop drive system 16 for moving the slide member 14 with respect to the column 12, and a spring biasing member 18 for applying torque to the drive system to offset the weight of the slidable member 14 and any devices mounted thereto, such as a microscope stage or head. The column 12 is fixed to base 13 which supports a coarse/fine adjusting mechanism 15 and an auxiliary adjusting mechanism 17.

Figure 2:
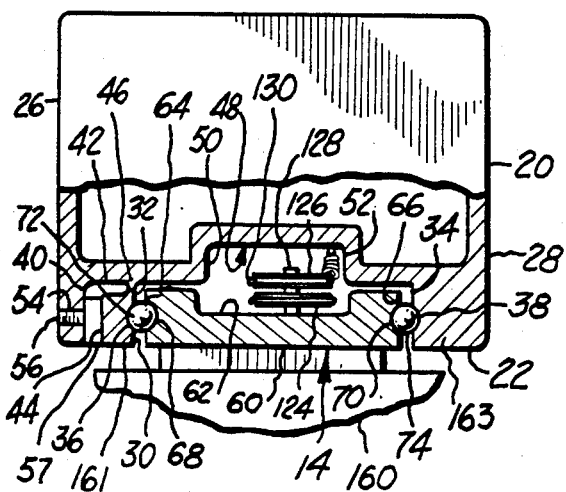
FIG. 2 is a sectional view taken along line 2—2 of FIG. 1.

As best seen in FIGS. 1 and 2, support column 12 comprises an elongated generally boxed shaped member 20, having front 22, rear 24 and side walls 26 and 28. Front wall 22 includes a vertical recess 30 which is defined by a pair of opposing sides 32 and 34. A ball race 36 is formed in side 32 while a corresponding ball race 38 is formed in side 34. Wall 22 includes a second vertical recess 48 having sides 50 and 52 which are substantially parallel to sides 32 and 34.

Front wall 22 includes an L-shaped slot 40 formed between wall 26 and side 32. As is best seen in FIG. 2, foot 42 of slot 40 extends from leg 44 toward side 32. A relatively thin section 46 of material remains between foot 42, side 32 and hinged portion 161. A plurality of threaded apertures 54 are formed in side 26, as best seen in FIG. 1, and receive adjusting scews 56.

Slide member 14 comprises front 60, rear 62 and sides 64 and 66, respectively. A ball raceway 68 is formed in side 64. A complimenting ball raceway 70 is formed in side 66. The slide member 14 is mounted to column 12 via ball bearings, such as is illustrated by 72 and 74 in FIGS. 1 and 2.

By referring to FIG. 1, it will be seen that support column 12 is mounted in any appropriate way (not shown) to base 13 which contains the coarse and fine adjusting mechanism 15 such as disclosed and claimed in assignee's U.S. Ser. No. 450,901, filed Dec. 21, 1982 (now U.S. Pat. No. 4,437,448). Briefly, the mechanism 15 comprises a coarse focus shaft 80 which is rotatably mounted in base 13 by bearings 81, 83 and 96. A pair of adjusting knobs 82 and 84 are mounted at opposite ends of the coarse adjusting shaft. A fine adjusting shaft 86 is coaxially mounted within coarse shaft 80 and includes a pair of oppositely mounted adjusting knobs 88 and 90 respectively. The bearing member 96 is supported on boss 98.

For purposes described later, shaft 80 also supports pulley 100, cable wrap reel 104 and spring biasing member 18. Pulley 100 is fixed via set screw 102 to shaft 80 between bearing 81 and boss 98. Cable wrap 104 is fixed to the coarse shaft 80, adjacent bearing 96, by set screw 106. The cable wrap reel includes a spiral groove 105.

The spring biasing member 18 comprises a torsion spring 108 which is fitted about a sleeve member 110 which is itself fixed over coarse shaft 80. As shown in FIG. 1, end 112 of torsion spring 108 is fixed to, for example, aperture 113 of base 13. The other end 114 is fixed to aperture 115 of collar 116 which, as explained below, is fixed via set screw 118 to coarse shaft 80 adjacent cable wrap reel 104.

As illustrated in FIGS. 1 and 3 and schematically in FIGS. 5 and 6, the closed loop drive system 16 includes a first pulley 120 rotatably mounted to shaft 122 which is received in recess 48 of column 12. Second and third pulleys 124 and 126 are rotatably supported by shaft 128 on side 62 of slide member 14. A non-elastic, flexible drive cable 130 couples the first, second and third pulleys together with the coarse/fine adjusting mechanism 15. One end 132 of the cable 130 is fixed to post 134 which, in turn, is fixed to and extends from column recess 48. As best seen in FIGS. 5 and 6, the cable 130 extends from post 134 down and approximately 180 degrees around slide member pulley 126 and back up around column pulley 120. Cable 130 wraps approximately 180° around pulley 120 extending down to engage and wrap several times around the spiral wrap reel 104 which, as mentioned previously, is mounted to coarse/fine adjusting mechanism 15. The cable 130 extends from wrap reel 104 upwardly to engage and wrap approximately 180° around pulley 124, and then down to where end 136 is fixed to coil spring 138. The spring 138 is in turn mounted to post 140 which is fixed to column 12 and provides a positive tensioning force to cable 130 ensuring that it remains taut.

Figure 4:
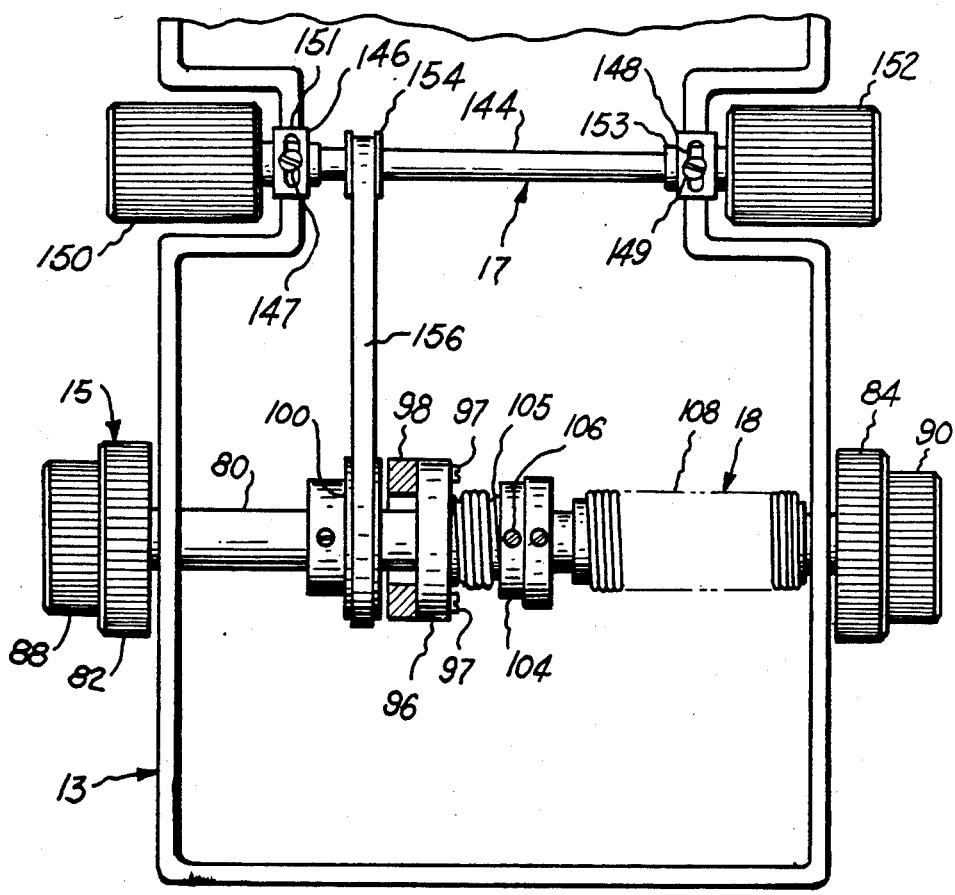
FIG. 4 is a bottom plan view of the instrument of FIG. 1 having the cover plate removed.

An auxiliary adjusting mechanism 17, best illustrated in FIG. 4, is mounted to base 13 adjacent coarse/fine adjusting mechanism 15. Mechanism 17 comprises shaft 144 which is rotatably mounted to base 13 by adjustable bearing and retainer assemblies 146 and 148. Suitable knobs 150 and 152 are mounted at opposite ends of shaft 144. A pulley 154 is mounted to shaft 144 so as to be in approximate alignment with pulley 100 mounted to coarse/fine adjusting mechanism 15. A pulley belt 156 couples pulleys 100 and 154 together. Belt 156 is preferably toothed as are pulleys 100 and 154.

In operation, the operator may grasp and rotate any appropriate adjusting knob (82, 84, 88 or 90) to rotate shaft 80 which in turn wraps cable 130 about cable wrap reel 104. However, it is evident from viewing the drawings and from the foregoing description, that cable 130 is fixed at end 132 and end 136, via spring 138, to support column 12 to form a closed loop. Therefore, since it is not possible to alter the length of cable 130, rotation of shaft 80 merely takes up a certain amount of cable 130 on one side of reel 104 and plays out the exact amount on the other side thereof. For instance, by viewing FIGS. 5 and 6, it will be seen that by rotating coarse/fine adjusting mechanism 15 in a clockwise direction, as indicated by arrow 158, cable 130 and pulleys 124 and 126 are pulled downward. Cable 130 is also pulled upward on the left hand side, over pulley 120, by the downward movement of pulley 126. Because the cable forms a closed loop system, as previously described, and because pulleys 124 and 126 are fixed to the slide member 14, rotation in a clockwise manner moves slide member 14 in a downward manner. Obviously, by rotating in a counter-clockwise manner the downward pull on the cable, between reel 104 and pulley 120 exerts an upward pull on pulley 126 and, hence, slide member 14.

Member 14 has been designed so that various assemblies may be selectively mounted or dismounted from it. For example, a stage 160, such as partially shown in FIG. 2, may be mounted to the slide member 14. Or, depending on the application, a head assembly containing appropriate optics may be mounted. In order to compensate for the differences in weight between the assemblies, a spring biasing member 18 is provided which allows for simple and easily accomplished adjustments. With this design, slide 14, and the assembly supported thereon, such as stage assembly 160, can be statically balanced at approximately midway in the travel of the slide member 14. This is accomplished by adjusting the torque applied to the adjusting mechanism 15 by the spring biasing member 18.

By interchanging that stage assembly 160 for another which is perhaps heavier or lighter, it is preferable to rebalance the system. To accomplish this, an operator would gain access to the bottom of the instrument 10 through removable cover 162 of base 13 so that screw 106 of cable wrap reel 104 may be loosened. The operator would then hold wrap reel 104, now uncoupled from shaft 80, in a relatively fixed position with one hand while, with the other hand, rotating either of the coarse adjusting knobs 82, 84. Depending on the direction of rotation of shaft 80, spring 108 is either tightened or loosened. Therefore, by rotating shaft 80 in either direction, the torque which spring 108 exerts on shaft 80 is either increased or decreased a corresponding amount. Obviously, by increasing the weight supported by the slide member 14, it becomes necessary to increase the torque delivered by spring 108. The operator would, therefore, tighten the spring an appropriate amount. After adjusting the torque, set screw 106 is locked down on coarse shaft 80 to restore static balance to the system.

The auxiliary focusing mechanism 17 is provided to afford the operator an alternative location for initiating focusing. As adjusting mechanism 15 is closer to the rear of the instrument 10 it is, for some people, awkward to reach. Mechanism 17 is positioned closer to the front of the instrument 10 and, thus, may be more convenient to grasp and rotate either knob 150 or 152. By rotating shaft 144, belt 156 is likewise rotated and, in turn, rotates pulley 100 and coarse/fine adjusting mechanism 15.

As the belt 156 is designed to be tautly positioned between pulley 100 and pulley 154, some distortion of the coarse/fine adjusting mechanism 15 may normally occur. However, bearing 96 which is journalled about coarse shaft 80 of mechanism 15 is provided to prevent such distortions. Once coarse/fine adjusting mechanism 15 has been preliminarily positioned in base 13, the bearing 96 is secured by screws 97 to boss 98, as best illustrated in FIG. 4. The auxiliary adjusting mechanism 17 is then positioned by loosening screws 147 and 149 which are fitted to slotted apertures 151 and 153 of bearing retainers 146 and 148 respectively. The auxiliary adjusting mechanism 17 is moved to tighten belt 156 on pulleys 100 and 154 thereby exerting the appropriate amount of tension. When mechanism 17 is properly positioned, screws 147 and 149 are locked down on bearing retainers 146 and 148.

By referring to FIG. 2, it will be seen that thin section 46 adjacent L-shaped slot 40 may be made to act similar to a hinge by manipulating adjusting screws 56. For instance, should there be too much play between slide member 14, screws 56 would be tightened to bear against a member 57 situated in leg 44 of slot 40, which in turn bears against the hinged portion 161 of the column having ball raceway 36 formed therein. By tightening screws 56, thin section 46 is caused to flex thereby acting as a hinge pivoting portion 161 toward slide member 14. The opposite side of slide member 14 is rigidly supported by ball bearing 74 and a sturdy unflexible portion 163 of column 12. Accordingly, the fit between the ball raceways and the ball bearings may be adjusted to remove some or all of the play. Obviously, in order to increase the play in the system, it is necessary to loosen screws 56 to release some of the pressure which they exert against hinge portion 161 of column 12. The plate 57 is manufactured from an appropriate material to ensure that screws 56 exert a relatively uniform force against the hinged portion 161 of the column 12. Plate 57 also prevents the screws 56 from digging into and distorting the hinged portion 161 of the column 12.

It should be understood that although only a certain embodiment of this invention has been shown and described in detail that there are other embodiments and modifications which could be made to the present invention without departing from the spirit or scope of the invention as set forth and defined in the appended claims.

It is claimed:

1. In an optical instrument, such as a microscope, having a primary adjusting mechanism rotatably mounted to a support member for providing primary adjustment to an adjustable member such as a stage or optical head assembly with respect to the support member, a secondary adjusting mechanism for providing a secondary adjustment to the adjustable member comprising:
   (a) a shaft rotatably mounted to the support member for selective rotation with respect to the primary adjusting mechanism; and
   (b) flexible drive means coupling said rotatable shaft to the primary adjusting mechanism whereby selective rotation of said rotatable shaft rotates said flexible drive means and said primary adjusting mechanism thereby imparting movement to said adjustable member.

2. The secondary adjusting mechanism as set forth in claim 1 wherein said flexible drive means comprises a drive belt.

3. The secondary adjusting mechanism as set forth in claim 2 wherein said drive belt is non-elastic.

4. The secondary adjusting mechanism as set forth in claim 1 wherein said rotatable shaft is juxtaposed and parallel to the primary adjusting mechanism.

5. The secondary adjusting mechanism as set forth in claim 2 wherein said rotatable shaft and the primary adjusting mechanism include pulleys mounted thereto for receiving said drive belt.

6. The secondary adjusting mechanism as set forth in either claim 1 or claim 2 wherein said rotatable shaft is adjustably mounted to said support with respect to the primary adjusting mechanism.

7. The secondary adjusting mechanism as set forth in either claim 1 or claim 3 and further including means coupling the primary adjusting member to the support member for compensating for the force exerted on the primary adjusting member by said flexible drive means.

8. The secondary adjusting mechanism as set forth in claim 7 wherein said coupling means comprises a bearing assembly fitted to the primary adjusting mechanism and fixed to the support member.

9. The secondary adjusting mechanism as set forth in claim 8 wherein said bearing assembly is adjustably mounted to the support member.

* * * * *